T. H. MacDONALD.

SHIRT.

No. 11,469. Reissued Feb. 5, 1895.

WITNESSES:

Frank S. Brosser

M. Frances Ellis.

INVENTOR

Thomas H. MacDonald by H. Harding

Atty.

UNITED STATES PATENT OFFICE.

THOMAS H. MACDONALD, OF PHILADELPHIA, PENNSYLVANIA.

SHIRT.

SPECIFICATION forming part of Reissued Letters Patent No. 11,469, dated February 5, 1895.

Original No. 529,181, dated November 13, 1894. Application for reissue filed December 22, 1894. Serial No. 532,725.

*To all whom it may concern:*

Be it known that I, THOMAS H. MACDONALD, a citizen of the United States, residing at Philadelphia, county of Philadelphia, and State of Pennsylvania, have invented a new and useful Improvement in Shirts, of which the following is a full, clear, and exact description, reference being had to the accompanying drawings, which form a part of this specification.

It is well known that the weakest part of a shirt, that part which is most likely to be creased or broken, is the upper portion of the bosom immediately adjoining, or a short distance below, the neck-band. In the first place, unless the wearer be full chested, the upper part of the bosom is unsupported and hence it is liable to be broken at this point; secondly, in case the bosom is long, it will strike the trousers band when the wearer assumes a sitting position, which will cause the joint between the neck-band and bosom, or the bosom immediately below its union with the neckband, to be creased and eventually to break or tear; thirdly, the heat of the body is great immediately under this portion of the bosom, which still further tends to weaken the shirt at this point.

My invention has for its object to provide a construction for shirts which will strengthen the bosom at or near its junction with the neck-band, not only absolutely but relatively to the remainder of the bosom, so as to make it the strongest instead of the weakest part of the bosom, whereby any strain great enough to cause the shirt to break or indent in the vicinity of the neck-band in the ordinary construction will be sustained by some other portion of the bosom where any breaking or creasing that may occur will be hidden from view by the vest of the wearer.

Figure 1:
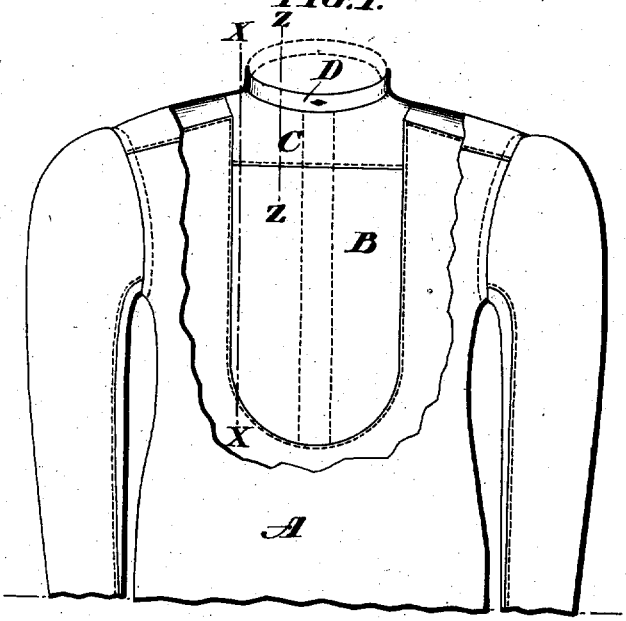
Figure 5:
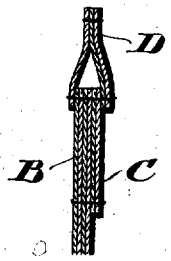
Figure 2:
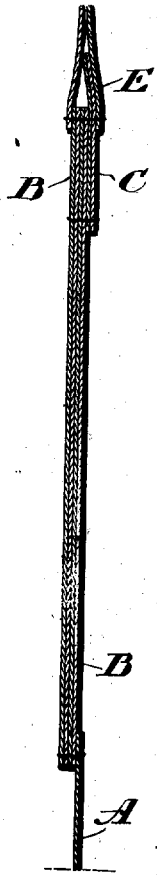
Figure 4:
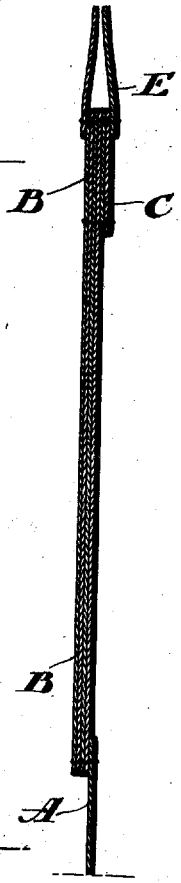
Figure 3:
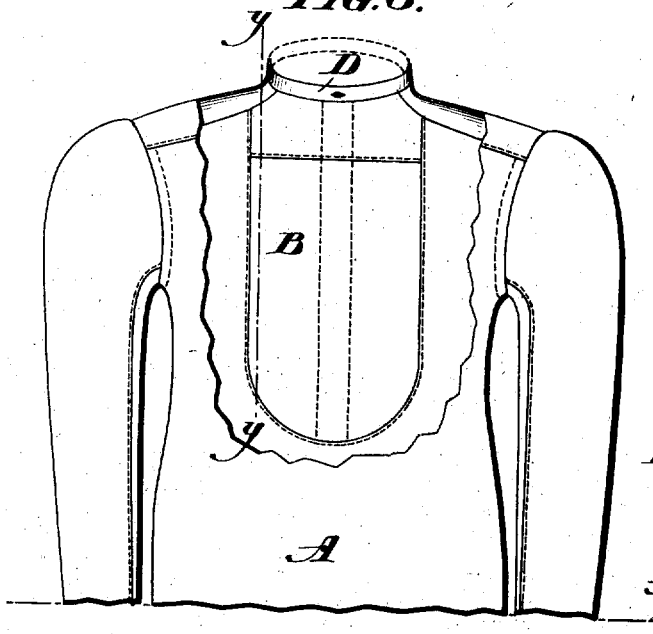

In the drawings—Figure 1 is a rear view of a shirt, the back being cut away to show the bosom, yoke and neck-band, constructed according to my invention; Fig. 3, the same modified; Fig. 2, a section on the line $x$—$x$, Fig. 1; Fig. 4, a section on the line $y$—$y$, Fig. 2; Fig. 5, a section on the line $z$—$z$, Fig. 1.

A represents the shirt, to which the bosom B is secured in the usual manner. As it is illustrated, the shirt has the front of the body cut to receive the bosom, which is the usual construction. The bosom is preferably four-ply, the outer ply being composed of linen, and the remaining three plies of muslin. All the plies, may, however, be of linen. The body of the shirt is of single ply. The yoke E is of doubly ply and the neckband D has three plies.

Referring particularly to Fig. 1; before stitching the neck-band to the bosom and yoke, and the yoke to the bosom, I cut a piece C, of cotton or linen, preferably of two plies, of a length equal to the width of the bosom, one side of which is straight and the other side of which is of a shape to conform to the curve of the neck-band. Centrally, this piece is an inch or two wide, being somewhat wider than this at its ends, so that when it is placed under the shirt bosom and up against the neck-band, the ends will extend back beyond the joint between the yoke and bosom. In this position, the strengthening piece is attached to the shirt, being stitched along its straight side to the under ply, or the two under plies of the bosom, so as not to be visible from the front or mar the appearance of the bosom.

As illustrated in Fig. 2, the four plies of the bosom and the two plies of the strengthening piece are placed between and stitched to the two plies of the yoke, while the two plies of the strengthening piece C, extending back beyond this junction are again stitched to the yoke at a point approximately above the middle of the shoulders.

Fig. 5 illustrates the method of attaching the two plies of the strengthening piece C and the four plies of the bosom B to the three plies of the neck-band D.

In Fig. 3 the construction is the same as that just described, except that the strengthening piece C does not extend back beyond the joint between the yoke and the bosom. The upper side of the strengthening piece, in this modified construction, conforms to the contour of the neck-band, as far as the junction of the latter with the yoke, beyond which it conforms to the shape of the yoke, so that the piece C is somewhat narrower at its ends than at its center.

The strengthening piece need not necessarily be of the shape I have described, the only requisite being that it be secured to the bosom so as to make it of extra thickness at its line of union with the neck-band.

By the afore-described construction, I make the bosom of extra thickness at its weakest part; and transfer the strain upon the bosom from the part immediately below the neck-band to a point below the strengthening piece, where the strain is not only distributed over a wider area, rendering the shirt less liable to break, but where any creasing that might occur would be hidden from view by the waist-coat of the wearer. If the strengthening piece were of a size equal to the size of the bosom, in other words, were the bosom made uniformly thick, say of six plies, I could not carry out the purposes of my invention, for the strain upon the shirt would be entirely sustained, as in the case of a three or four-ply bosom, by that portion of the bosom immediately adjoining the neck-band, whereas the object of my invention is, not solely to make the upper part of the bosom strong enough to resist this breaking strain, but to make it stronger than the remainder of the bosom, so that the strain will be sustained by the weakest portion of the bosom, that is to say, at some point below the lower side of the strengthening piece.

Having now fully described my invention, what I claim, and desire to protect by Letters Patent, is—

A shirt having its bosom provided with a reinforce at its junction with the neck-band, said reinforce being permanently secured to the bosom and extending to and not beyond the juncture of the bosom and neck-band, whereby the bosom at the reinforced portion is thicker than the remainder thereof.

In testimony of which invention I have hereunto set my hand.

THOMAS H. MACDONALD.

Witnesses:

FRANK S. BUSSER,
M. FRANCES ELLIS.